(12) United States Patent
Landau (10) Patent No.: US 10,706,180 B2
(45) Date of Patent: Jul. 7, 2020

(54) SYSTEM AND METHOD FOR ENABLING A MALWARE PREVENTION MODULE IN RESPONSE TO A CONTEXT SWITCH WITHIN A CERTAIN PROCESS BEING EXECUTED BY A PROCESSOR

(71) Applicant: Endgame. Inc., Arlington, VA (US)

(72) Inventor: Gabriel Landau, Glen Burnie, MD (US)

(73) Assignee: Endgame, Inc., Arlington, VA (US)

( * ) Notice: Subject to any disclaimer, the term of this patent is extended or adjusted under 35 U.S.C. 154(b) by 161 days.

(21) Appl. No.: 15/644,039

(22) Filed: Jul. 7, 2017

(65) Prior Publication Data

US 2019/0012486 A1    Jan. 10, 2019

(51) Int. Cl.
*G06F 21/75*  (2013.01)
*G06F 9/30*  (2018.01)
(Continued)

(52) U.S. Cl.
CPC .......... *G06F 21/75* (2013.01); *G06F 9/30058* (2013.01); *G06F 9/30145* (2013.01); *G06F 9/3844* (2013.01); *G06F 9/3846* (2013.01); *G06F 9/3851* (2013.01); *G06F 9/3861* (2013.01); *G06F 21/53* (2013.01); *G06F 21/554* (2013.01); *G06F 21/74* (2013.01)

(58) Field of Classification Search
CPC .... G06F 21/75; G06F 9/3846; G06F 9/30058; G06F 9/30145
See application file for complete search history.

(56) References Cited

U.S. PATENT DOCUMENTS 7,797,747 B1 *  9/2010  Ferrie ................... G06F 21/562
                                                             726/22
8,239,688 B2    8/2012  De Atley
(Continued)

FOREIGN PATENT DOCUMENTS

WO    WO2017180317 A1    10/2017
WO    WO2017197142 A1    11/2017
WO    WO2019010448 A1    1/2019

OTHER PUBLICATIONS

Ishii, Y. et al., "Revisiting Local History for Improving Fused Two-Level Branch Predictor", JWAC-2: Championship Branch Prediction Program Saturday, Jun. 4, 2011, 5 pages. (Year: 2011).*

(Continued)

*Primary Examiner* — Michael Pyzocha
(74) *Attorney, Agent, or Firm* — Carr & Ferrell LLP (57) ABSTRACT

A performance monitoring unit in a processor is programmed to issue an interrupt when a context switch occurs within an operating system if the currently executing thread belongs to a process that is subject to the malware prevention mechanism of the present invention. The interrupt enables a module that identifies mispredictions by the branch prediction unit of the processor and analyzes the address of the branch that was not predicted correctly. If the address of the branch is not contained on an existing whitelist of permissible branch addresses, and alert is generated and/or a protective action is taken. Such protective actions may include thread suspension, thread termination, process suspension, or process termination.

25 Claims, 12 Drawing Sheets

(51) Int. Cl.
*G06F 9/38* (2018.01)
*G06F 21/74* (2013.01)
*G06F 21/53* (2013.01)
*G06F 21/55* (2013.01)

(56) References Cited

U.S. PATENT DOCUMENTS

| | | | |
|---|---|---|---|
| 9,734,326 B2* | 8/2017 | Heisswolf | G06F 21/52 |
| 10,121,010 B2 | 11/2018 | Landau et al. | |
| 10,146,579 B2* | 12/2018 | McKenney | G06F 9/505 |
| 10,423,777 B2 | 9/2019 | Spisak et al. | |
| 2006/0080470 A1 | 4/2006 | Sollenberger et al. | |
| 2006/0123172 A1* | 6/2006 | Herrell | G06F 13/24 |
| | | | 710/269 |
| 2007/0101431 A1 | 5/2007 | Clift et al. | |
| 2008/0140897 A1 | 6/2008 | Ganguly | |
| 2008/0256346 A1* | 10/2008 | Lee | G06F 9/322 |
| | | | 712/239 |
| 2009/0044274 A1* | 2/2009 | Budko | G06F 21/53 |
| | | | 726/24 |
| 2010/0281540 A1 | 11/2010 | Alme | |
| 2011/0004935 A1* | 1/2011 | Moffie | G06F 21/53 |
| | | | 726/23 |
| 2011/0209158 A1 | 8/2011 | Paul | |
| 2011/0264894 A1 | 10/2011 | Lin | |
| 2013/0036464 A1 | 2/2013 | Glew et al. | |
| 2013/0145429 A1 | 6/2013 | Mendel et al. | |
| 2013/0174257 A1 | 7/2013 | Zhou | |
| 2013/0283382 A1 | 10/2013 | Kim et al. | |
| 2014/0075556 A1 | 3/2014 | Wicherski | |
| 2014/0123286 A1 | 5/2014 | Fischer et al. | |
| 2014/0281713 A1 | 9/2014 | Hampapur et al. | |
| 2014/0282622 A1 | 9/2014 | Frazier et al. | |
| 2014/0283056 A1* | 9/2014 | Bachwani | G06F 21/56 |
| | | | 726/23 |
| 2014/0298112 A1 | 10/2014 | Otsuka et al. | |
| 2015/0033227 A1* | 1/2015 | Lin | G06F 21/55 |
| | | | 718/1 |
| 2015/0052339 A1 | 2/2015 | Suzuki | |
| 2015/0095628 A1 | 4/2015 | Yamada et al. | |
| 2015/0220464 A1* | 8/2015 | Heisswolf | G06F 21/52 |
| | | | 710/267 |
| 2015/0339480 A1* | 11/2015 | Lutas | G06F 21/56 |
| | | | 726/22 |
| 2016/0092673 A1* | 3/2016 | LeMay | G06F 21/56 |
| | | | 718/1 |
| 2016/0117229 A1 | 4/2016 | Epstein | |
| 2016/0196425 A1 | 7/2016 | Davidov et al. | |
| 2016/0328561 A1* | 11/2016 | Tamir | G06F 21/552 |
| 2017/0039371 A1 | 2/2017 | Lukacs et al. | |
| 2017/0083702 A1* | 3/2017 | Gathala | G06F 21/552 |
| 2017/0286334 A1* | 10/2017 | Khanna | G06F 13/24 |
| 2017/0300688 A1 | 10/2017 | Spisak et al. | |
| 2017/0329973 A1 | 11/2017 | Landau et al. | |

OTHER PUBLICATIONS

Pierce, Cody et al., "Capturing 0day Exploits with PERFectly Placed Hardware Traps", Proceeding of the Black Hat USA, 2016, 7 pages. (Year: 2016).*

"International Search Report" and "Written Opinion of the International Searching Authority," Patent Cooperation Treaty Application No. PCT/US2018/041139, dated Sep. 21, 2018, 17 pages.

"International Search Report" and "Written Opinion of the International Searching Authority," Patent Cooperation Treaty Application No. PCT/US2017/024300, dated Jul. 21, 2017, 9 pages.

* cited by examiner

| Address | Instruction |
|---|---|
| 0001 | ADD Register A Register B Register C |
| 0002 | BRANCH 0004 |
| 0003 | LOAD Register D 5587 |
| 0004 | STORE Register C |
| 0005 | ADD Register C Register D Register E |
| ... | |

FIGURE 6 (PRIOR ART)

Register A

| Address | Instruction |
|---|---|
| 10000 | ~~LOAD Register E~~ BRANCH 9000 |

| Address | Instruction |
|---|---|
| 0001 | ADD Register A Register B Register C |
| 0002 | BRANCH 0004 |
| 0003 | LOAD Register D 5587 |
| 0004 | STORE Register C |
| 0005 | BRANCH Register A |
| ... | |
| 8000 | LOAD Register E |
| ... | |
| 9000 | *Beginning of Malicious Code* |

SYSTEM AND METHOD FOR ENABLING A MALWARE PREVENTION MODULE IN RESPONSE TO A CONTEXT SWITCH WITHIN A CERTAIN PROCESS BEING EXECUTED BY A PROCESSOR

FIELD OF THE DISCLOSURE

A performance monitoring unit in a processor is programmed to issue an interrupt when a context switch occurs within an operating system if the currently executing thread belongs to a process that is subject to the malware prevention mechanism of the present invention. The interrupt enables a module that identifies mispredictions by the branch prediction unit of the processor and analyzes the address of the branch that was not predicted correctly. If the address of the branch is not contained on an existing whitelist of permissible branch addresses, an alert is generated and/or a protective action is taken. Such protective actions may include thread suspension, thread termination, process suspension, or process termination.

BACKGROUND

As computing devices become increasingly complex, viruses and malware also are becoming increasingly complex and difficult to detect and prevent. While the prior art includes many approaches for scanning non-volatile storage, such as hard disk drives, for such threats, the prior art includes few satisfactory solutions for detecting malicious code loaded into memory or the processor itself. The prior art also is lacking in the ability to detect malicious instructions before they are executed, particularly in situations where the malicious instructions are "new" or are known instructions used in a new way and are not part of a well-known virus or malware.

Figure 1:
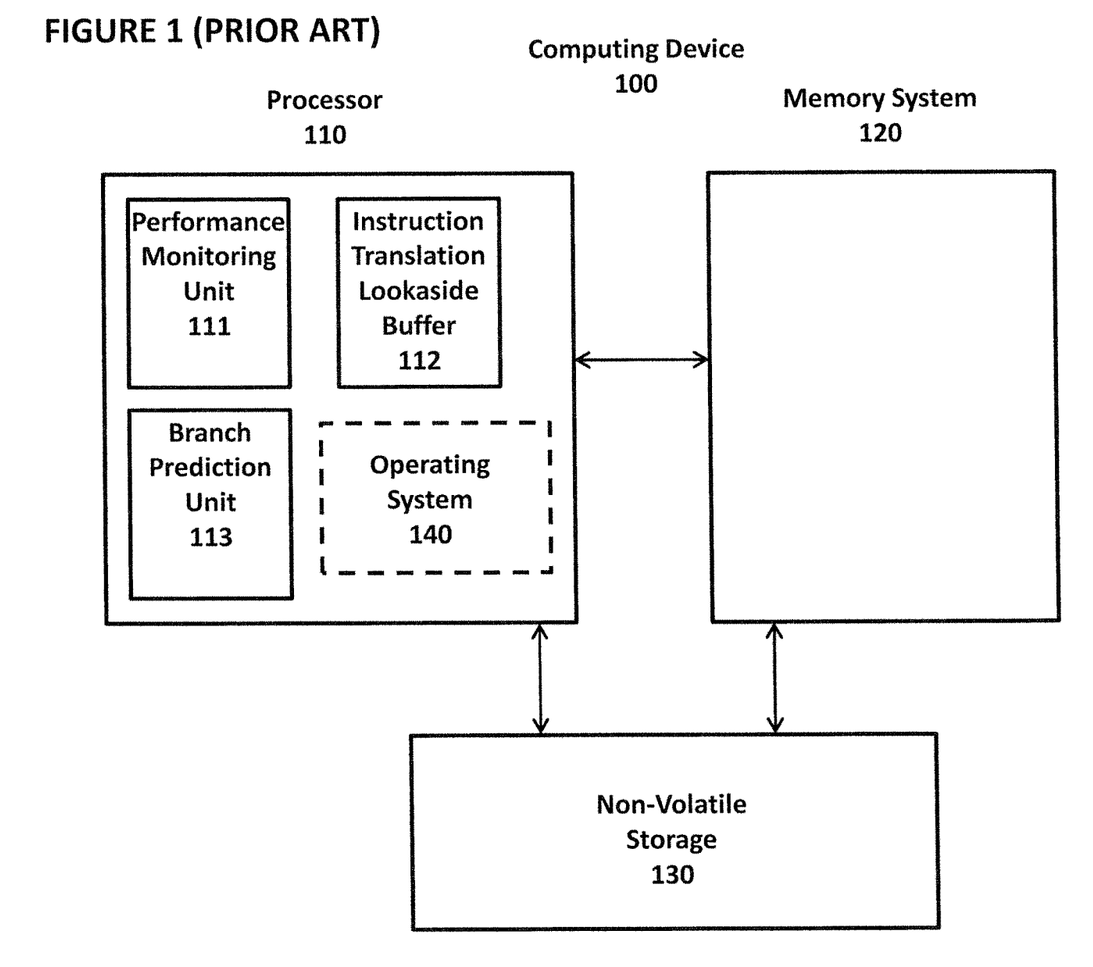
FIG. 1 depicts a prior art computing device.

FIG. 1 depicts exemplary prior art computing device 100 comprising processor 110, memory 120, and non-volatile storage 130. One of ordinary skill in the art will understand that processor 110 can include a single processor core or multiple processor cores as well as numerous cache memories, as is known in the prior art. Processor 110 comprises performance monitoring unit 111, instruction translation lookaside buffer 112, and branch prediction unit 113. Processor 110 typically runs operating system 140. Examples of operating system 140 include the operating systems known by the trademarks Windows® by Microsoft, MacOS® and iOS® by Apple, Chrome OS® and Android® by Google, Linux, and others. Memory 120 is presented at a high-level and can include cache memory or other memory located in the processor or in the same chip as the processor and also can include external memory (sometimes referred to as main memory). Non-volatile storage 130 typically comprises one or more hard disk drives, solid state drives, RAIDs, or other storage media.

Figure 2:
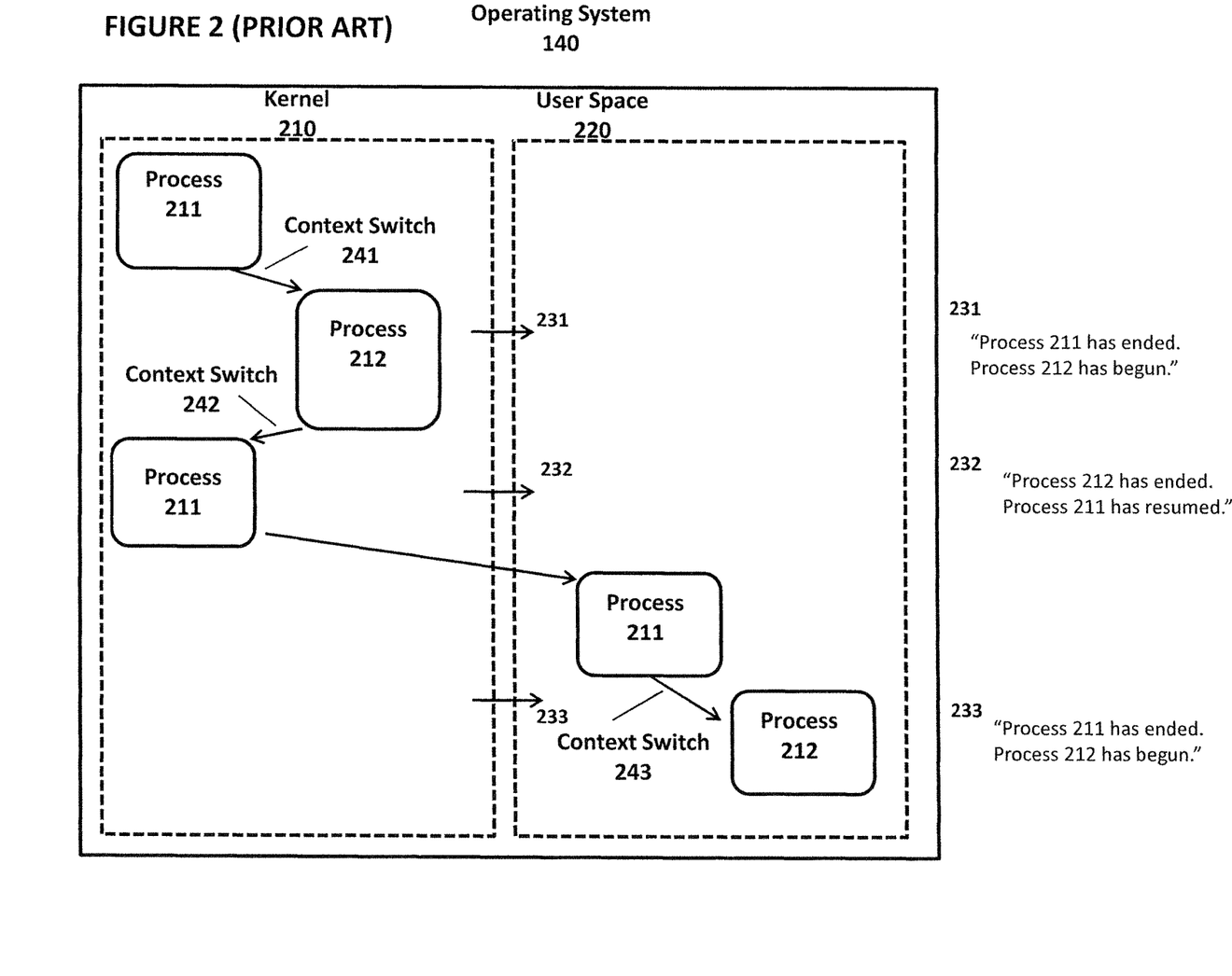
FIG. 2 depicts context switches in a prior art operating system.

In FIG. 2, operating system 140 can execute multiple processes. For purposes of this application, a "process" is an instance of a computer program to be executed and comprises lines of code. A process optionally can comprise one or more threads. In FIG. 2, the processes can be divided into those that occur in kernel 210 and those that occur in user space 220. Kernel 210 comprises the core of operating system 140. User space 220 comprises other code run by processor 110 that is not part of kernel 210, and includes most user applications.

Figure 3:
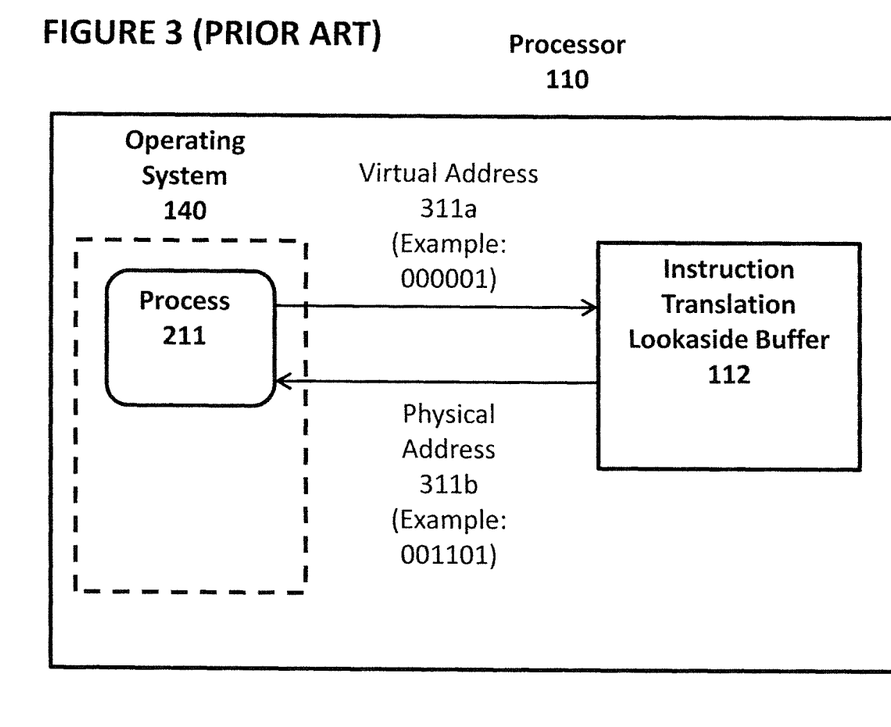
FIG. 3 depicts an instruction translation lookaside buffer in a prior art processor.

In the example shown in FIG. 2, operating system 140 might be running process 211. It is assumed in this example that operating system 140 wishes to end process 211 and begin process 212, which leads to context switch 241. A "context switch" is an action by the processor to store a state at the time a process ends so that the process can be resumed at a later time, which might involve storing register values and erasing buffers. For example, with reference to FIG. 3, operating system 140 is running process 211. Instruction translation lookaside buffer 112 stores a mapping between virtual addresses utilized by process 211 and physical addresses representing memory locations in memory 120 or storage locations in non-volatile storage 130. For instance, process 211 might need access virtual address 311a (e.g., "000001"). Instruction translation lookaside buffer 112 will be consulted and will respond that the virtual address 311a corresponds to physical address 311b (e.g., "001101"). Notably, each process uses its own set of virtual addresses, and kernel 210 of operating system 140 erases (or flushes) instruction translation lookaside buffer 112 whenever there is a context switch. Thereafter, the new process can utilize instruction translation lookaside buffer 112 for its own purposes.

With reference again to FIG. 2, at some point after context switch 241 occurs, kernel 210 will make the existence of the context switch knowable to code running "outside" of the kernel, for example, through an API. Thus, in response to an API request, kernel 210 might send message 231 to code running in user space 220 indicating that process 211 has ended and process 212 has begun.

Later in the example of FIG. 2, process 212 ends, context switch 242 occurs, and process 211 resumes. Kernel 210 sends message 232 indicating that process 212 has ended and process 211 has resumed. In this example, a mode switch occurs and process 211 continues in user space 220. Process 211 then ends, context switch 243 occurs, and process 212 begins. Kernel 210 sends message 233 indicating that process 211 has ended and process 212 has begun.

Notably, in the prior art, messages 231, 232, and 233 are sent asynchronously by kernel 210 and not necessarily immediately when a context switch occurs. Thus, the code running outside of kernel 210 may not know about a context switch occurring until after the context search already has occurred. This is a severe limitation in the prior art, at least for purposes of detecting and stopping malware. For example, if process 212 is a malware process, code outside of kernel 210 will not know that process 211 has ended and process 212 has begun until after process 212 has already begun. By then, the damage may already have occurred.

Figure 4:
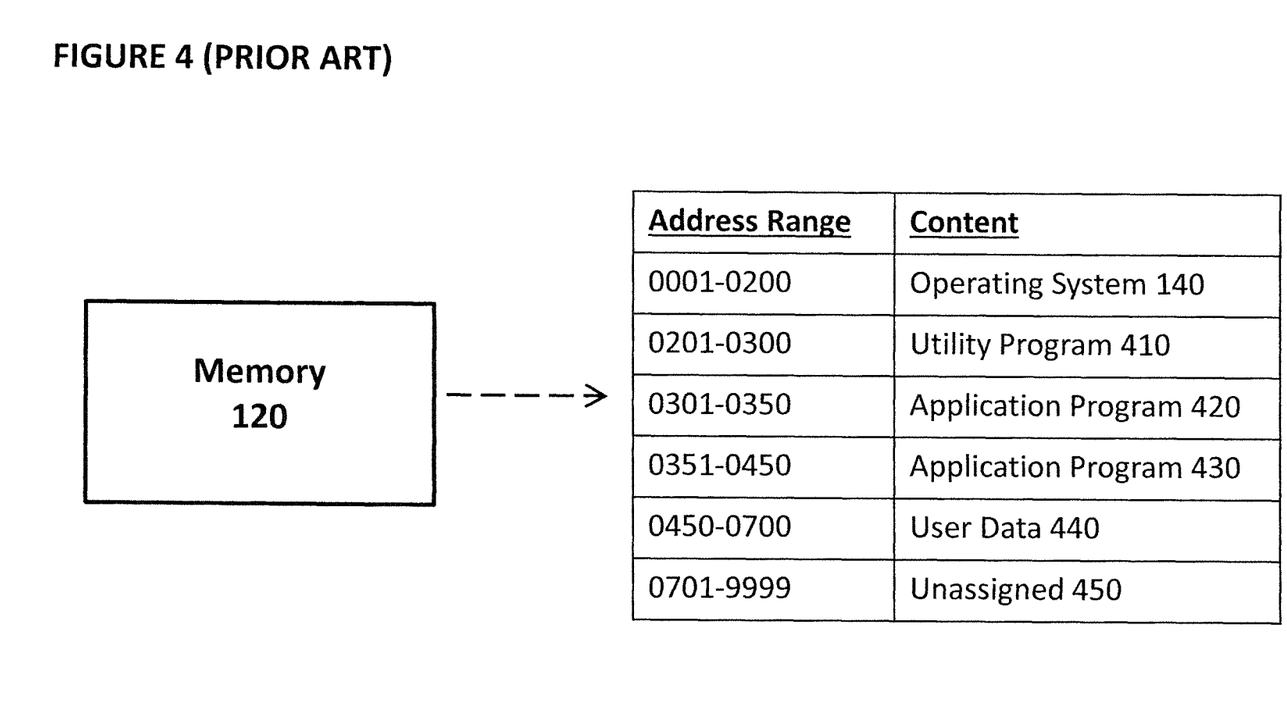
FIG. 4 depicts various software programs loaded into memory in the prior art.

FIG. 4 depicts another aspect of the prior art. Software code and user data are loaded into memory 120. In this example, each set of software code is assigned a certain range in memory 120. Operating system 140 is assigned addresses 0001-0200, utility program 410 is assigned addresses 0201-0300, application program 420 is assigned addresses 0301-0350, application program 430 is assigned addresses 0351-0450, user data 440 is assigned addresses 0450-0700, and the addresses 0701-9999 at this point are unassigned addresses 450. These addresses are intentionally simplified for purposes of discussion and illustration, and one of ordinary skill in the art will appreciate that in an actual implementation, addresses would be binary numbers instead of base-10 numbers and potentially would span a much larger address space. For instance, typical address space in prior art memory 120 includes 32-bit and 64-bit addresses.

Figure 5:
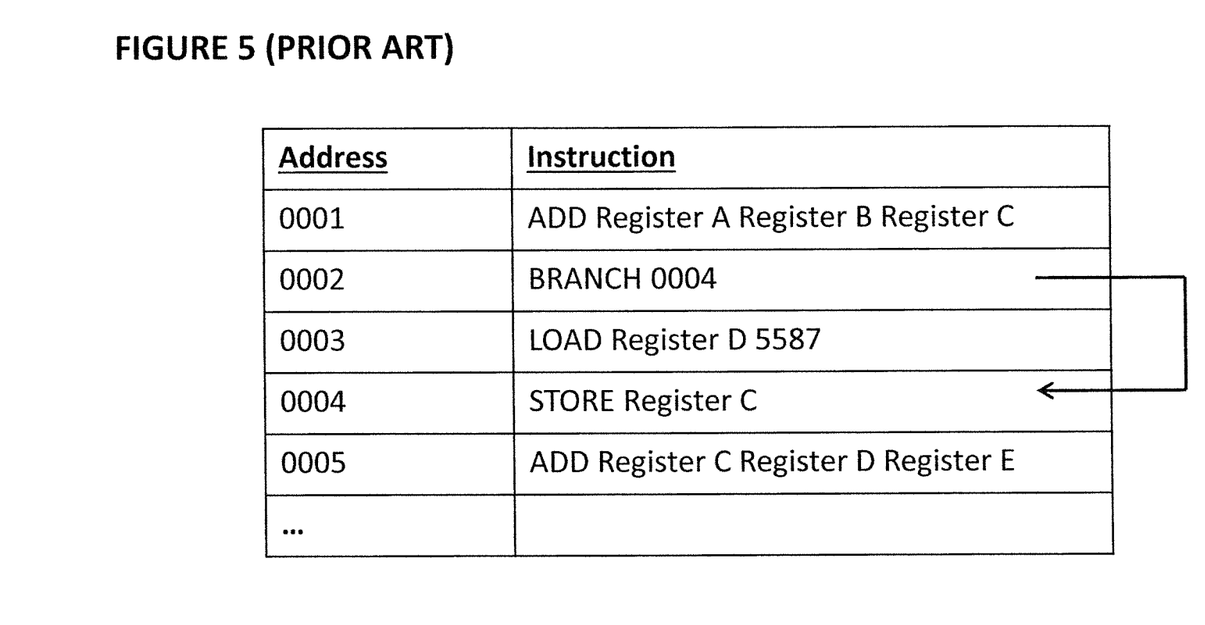
FIG. 5 depicts an exemplary set of instructions in software code in the prior art.

FIG. 5 shows software code at a more granular level. A set of exemplary instructions are shown as stored in memory 120. Address 0001 contains an ADD instruction, address 0002 contains a BRANCH instruction, address 0003 contains a LOAD instruction, address 0004 contains a STORE instruction, and address 0005 contains an ADD instruction. The BRANCH instruction at address 0002, when executed, will cause the processor to next execute the instruction at address 0004.

Figure 6:
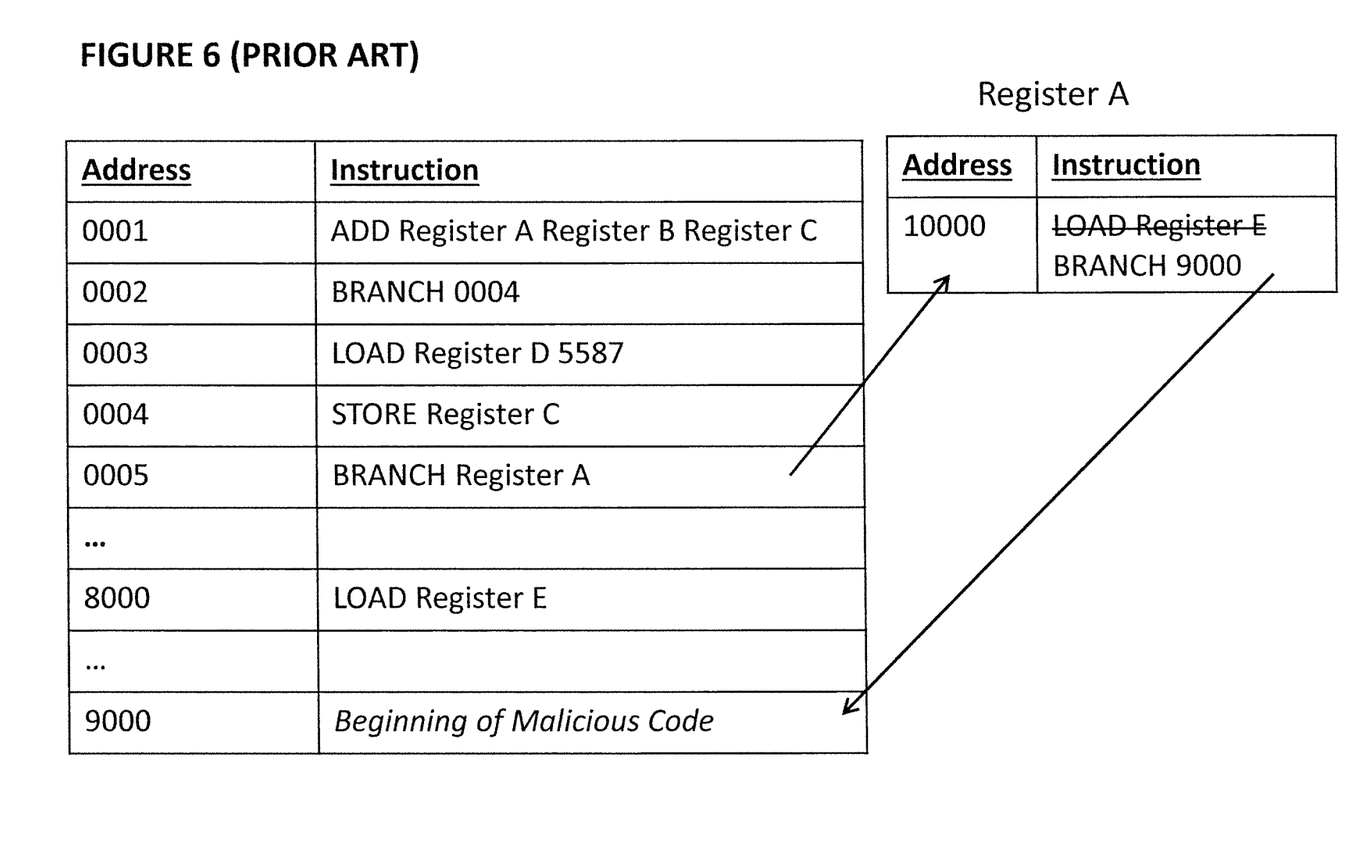
FIG. 6 depicts a common malware attack using a BRANCH instruction in the prior art.

FIG. 6 depicts a common approach of malicious code in the prior art. Here, the instruction at address 0005 is a BRANCH instruction to the address stored in Register A, which is address 10000. However, in this example, a virus or malware hijacks the BRANCH instruction by modifying the contents of Register A to cause processor 110 to execute the instruction stored at address 9000, which is the beginning point for malicious code. This causes the malicious instructions to be executed instead of the intended instructions. This is often referred to as a "control-flow hijack," because the malicious instructions interrupt and take over the control-flow of processor 110. A control-flow hijack represents the very first point in which an attacker is able to redirect control-flow of a running process.

What is needed is a mechanism for detecting context switches immediately within certain processes in which one wishes to perform malware detection so that malware detection procedures can be invoked before a new process begins. What is further needed is a mechanism for analyzing the new process and to identify any suspicious BRANCH instructions that may indicate malware.

SUMMARY OF THE INVENTION

A performance monitoring unit in a processor is programmed to issue an interrupt when a context switch occurs within an operating system if the currently executing thread belongs to a process that is subject to the malware prevention mechanism of the present invention. The interrupt enables a module that identifies mispredictions by the branch prediction unit of the processor and analyzes the address of the branch that was not predicted correctly. If the address of the branch is not contained on an existing whitelist of permissible branch addresses, an alert is generated and/or a protective action is taken. Such protective actions may include thread suspension, thread termination, process suspension, or process termination.

DETAILED DESCRIPTION OF PREFERRED EMBODIMENTS

Figure 7:
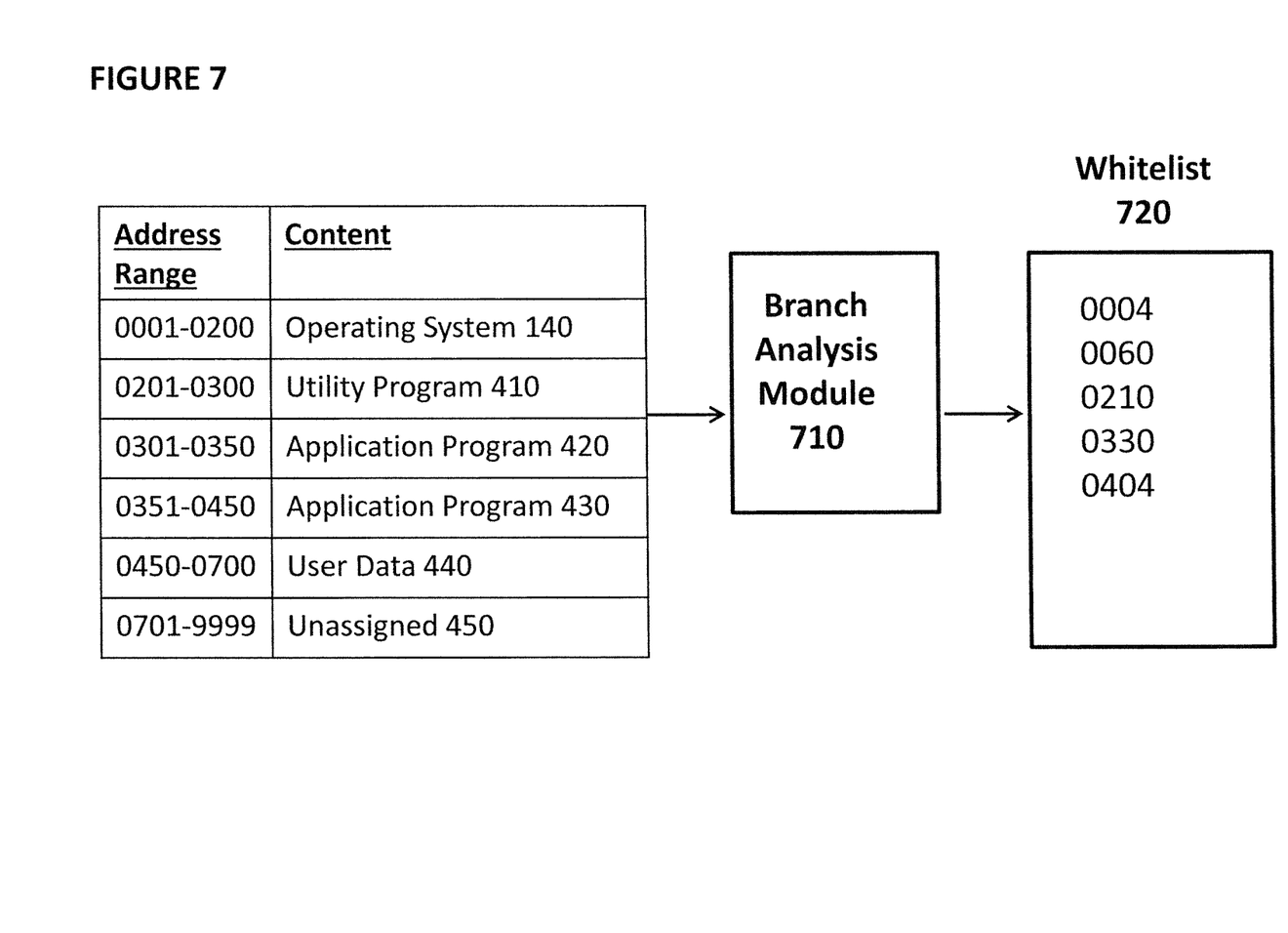
FIG. 7 depicts the generation of a whitelist containing valid BRANCH address destinations.

FIG. 7 depicts aspect of an embodiment of the invention. Branch analysis module 710 runs on processor 110 and comprises lines of executable computer code. Branch analysis module 710 analyzes all instructions contained in memory 120. For each BRANCH instruction that it finds, it determines if that BRANCH instruction refers to an address assigned to a software module that is a known, legitimate software module. If the address is assigned to such a software module, then the address is added to whitelist 720, which contains a list of known, valid branch locations. If the address is not assigned to such a software module, then the address is not added to whitelist 720, as the BRANCH instruction for that address may be a portion of malicious code.

Figure 8:
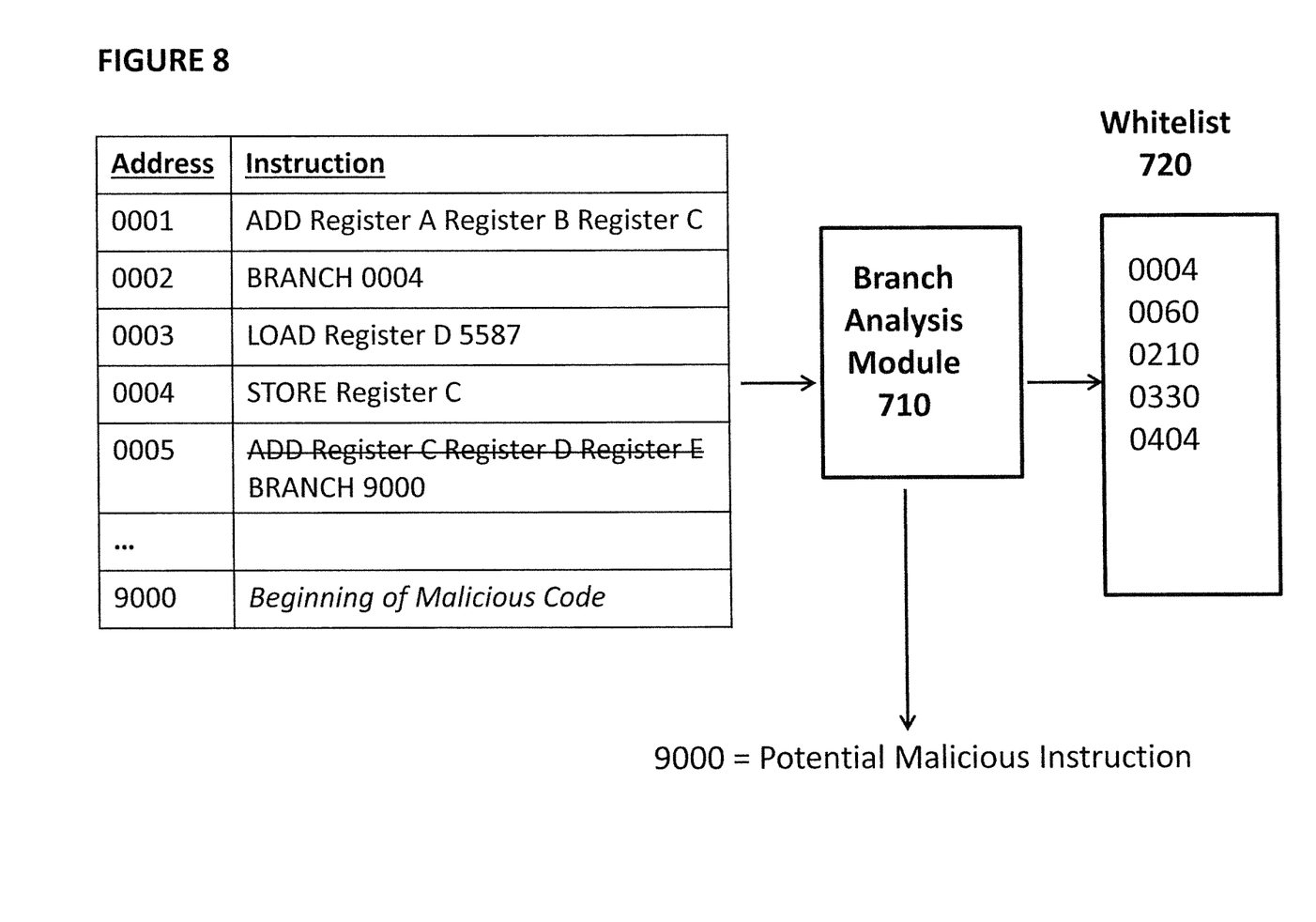
FIG. 8 depicts the identification of a BRANCH instruction that is not added to the whitelist.

Thus in the example of FIG. 8, branch analysis module 710 populates whitelist 720 with the entries 0004, 0060, 0210, 0330, 0404, which represent destinations of BRANCH instructions that are located with an address range assigned to a known, legitimate software module. On the other hand, the address 9000 is not placed on whitelist 720 and instead is identified as potential malicious code, as address 9000 is contained with the unassigned address range. It is unlikely that a legitimate software module would execute a BRANCH to a location in the unassigned address range.

Additional detail regarding branch analysis module 710 is now provided. Branch analysis module 710 parses software code stored in memory 120, which comprises binary executable files, and separates the code into its appropriate sections. Relocation information in the form of an absolute address is retrieved from data sections of each executable image, such as a BRANCH instruction. Each absolute address that is found that falls within the address range of the binaries code section is considered to be a legitimate BRANCH destination and added to whitelist 720.

Branch analysis module 710 then scans the code section of each binary image in search of specific byte sequences that indicate instructions that are loading an address into a register. Each address identified after the target byte sequence is treated as a relative instruction pointer (IP) address, and analysis is performed to determine whether the relative address falls into the code section of the binary image. Those that pass this criteria are considered legitimate BRANCH destinations.

Next, the algorithm scans for jump tables (switch statements) in code, and the code section for each loaded image is searched for an instruction byte sequence that indicates loading IP relative addresses into a register. If the relative address falls within a read-only data section of the binary, further analysis to identify jump tables is done as follows:

a. The first and second DWORD/QWORD at the data section offset is treated as an IP relative address. If both relative addresses when added to the offset of the load instruction points into the code section AND the two offsets within the code section are within a specific threshold of one another, then the structure in read-only data is treated as a jump table.

b. The first pass completes with the identification of all jump table locations in memory. Next, the algorithm traverses each potential entry in each jump table and treats each relative address as a jump destination (when added to the offset of the load instruction) until it encounters a relative address that does not point into the code section. Each branch destination found in each jump table is added to the whitelist.

Prior to being added to whitelist 720, each branch location address that is identified in binary code is added to its appropriate base address of the binaries executable code page in virtual memory based on the memory map of the target thread of execution.

If processor 110 follows an instruction set architecture (ISA) where instructions are both larger than 8-bits and aligned on memory boundaries equal to a power of 2, then a further heuristic can be applied to ensure a candidate BRANCH destination lies on a 2, 4, 8, 16, 32, etc. byte aligned boundary depending on the instruction size and discarding those addresses that do not fall on that byte boundary.

Whitelist 720 comprises a data structure. To generate whitelist 720, each function entry point or legitimate branch location address is stored in a data structure that allows for fast lookup. Additionally, the data structure ensures a reduced memory footprint for the storage of the branch location list. In one embodiment, the data structure is a simple sorted list upon which a binary search is performed. In another embodiment, the data structure is a hashtable data structure. In another embodiment, the data structure is a bloom filter data structure. One of ordinary skill in the art will appreciate that other types of data structures can be used.

With reference again to FIG. 1, branch prediction unit 113 enhances the performance of processor 110 by pre-fetching instructions at addresses that it deduces are likely to be the destination of BRANCH instructions. Processor 110 typically will load the pre-fetched instruction into a fast cache memory. Performance monitoring unit 111 can be configured to measure the performance of processor 110 using certain criteria such as cache misses/hits and branch prediction misses/hits. If the branch prediction unit 113 continually misses on its branch predictions, then that will decrease the performance of processor 110. Such data can be made available by performance monitoring unit 111 to other software modules. In one embodiment, performance monitoring unit 111 is configured to perform a trap whenever any of these events of interest occur, which enables the integrity checking heuristics described above to be performed real-time during operation of processor 110. In another embodiment, performance monitoring unit 111 is configured to perform a trap whenever the events of interest occur but only when it has been enabled by malware interrupt service routine 912, discussed below.

Figure 9:
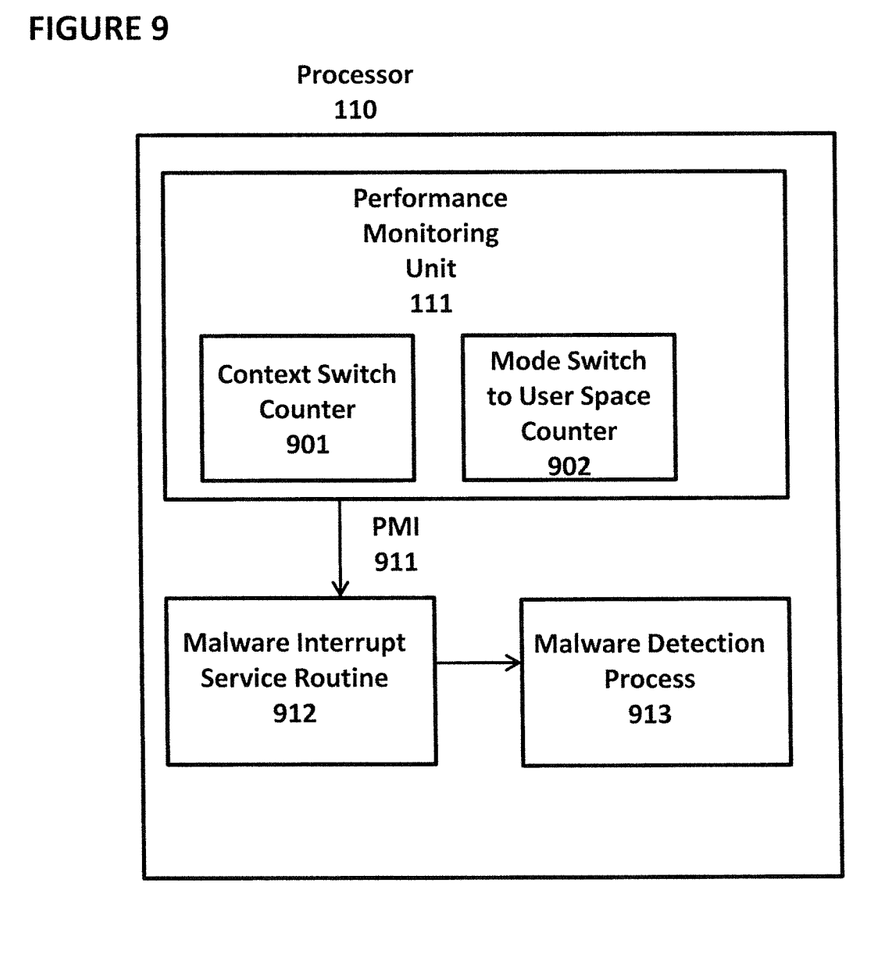
FIG. 9 depicts an embodiment for identifying a context switch.

FIG. 9 depicts another aspect of an embodiment of the invention. Processor 110 comprises performance monitoring unit 111. Performance monitoring unit 111 comprises a plurality of counters that can be configured for different purposes.

Here, one counter is configured to be context switch counter 901 (hereinafter also referred to as "counter 901"), which begins at a value of −1 and increments by 1 whenever instruction translation lookaside buffer 112 is flushed (which occurs when a context switch occurs). In the example where operating system 140 is Windows and processor 110 is an Intel x86 or EMT64 architecture, the flushing is identified by detecting an "ITLB.ITLB_FLUSH" event.

Another counter is configured to be mode switch to user space counter 902 (hereinafter also referred to as "counter 902"), which begins at a value of −1 and increments by 1 whenever a mode switch occurs from kernel 210 to user space 220. In the example where operating system 140 is Windows and processor 110 is an Intel x86 or EMT64 architecture, this can be implemented by incrementing counter 902 whenever a "CPL_CYCLES.RING123" event occurs, which corresponds to every clock cycle while the CPU is executing user space 220, meaning that it will increment as soon as CPU control is passed from kernel 210 to user space 220.

Performance monitoring unit 111 is further configured to generate performance monitoring interrupt (PMI) 911 whenever context switch counter 901 reaches a value of 0 or when mode switch to user space counter 902 reaches a value of 0. Performance monitoring interrupt 911 is sent to malware interrupt service routine 912, which is a process within kernel 210.

Figure 10:
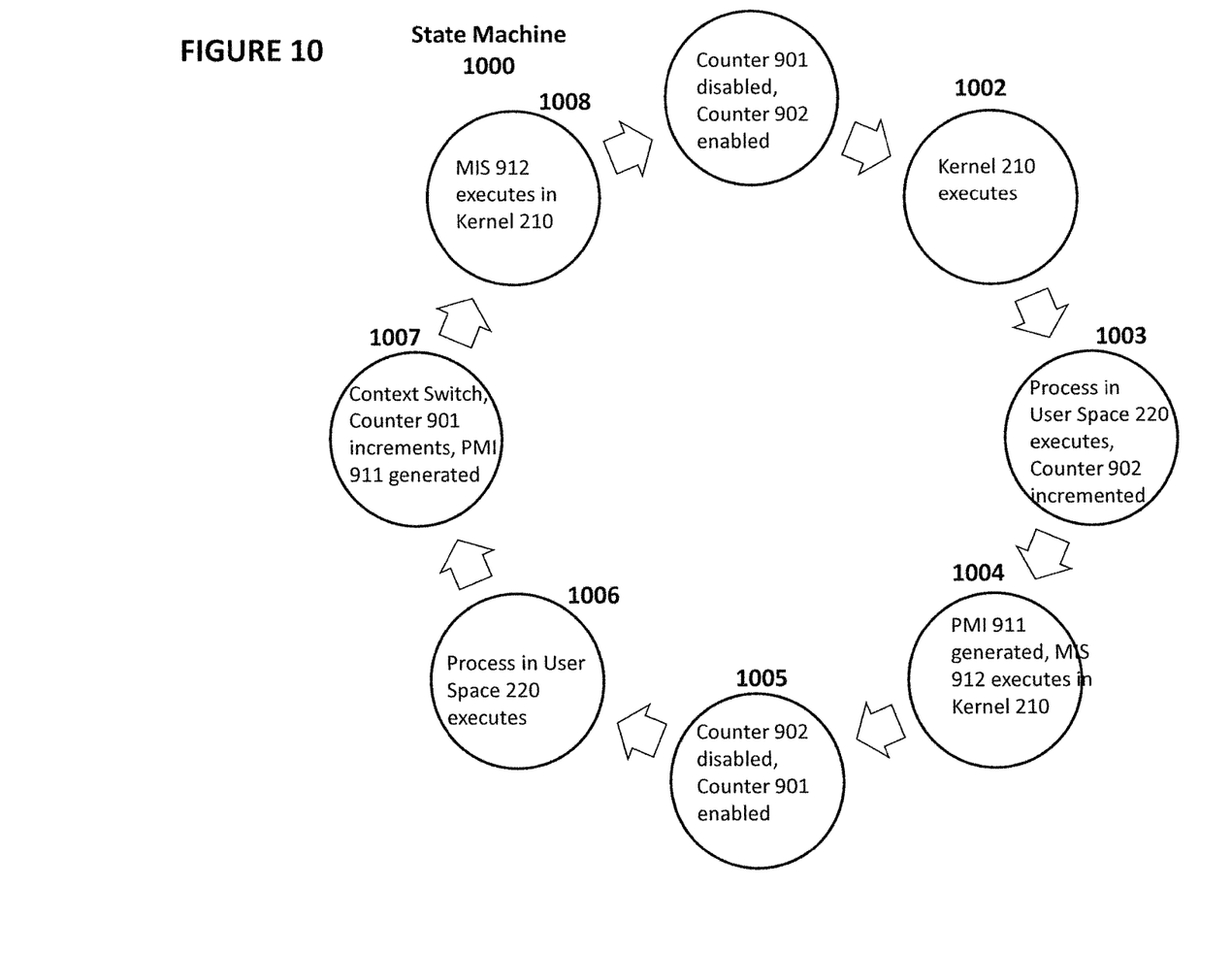
FIG. 10 depicts a state machine for identifying a context switch.

With reference to FIG. 10, computing device 100 implements state machine 1000. Computing device begins in step 1001. The first execution of step 1001 is implemented by an initialization process in kernel 210, because malware interrupt service routine 912 cannot fully operate until counters 901 and 902 are initialized. Every subsequent execution of step 1001 starts when state machine 1000 is at step 1008 and performance monitoring interrupt 911 is received based on an increment from counter 901. Malware interrupt service routine 912 disables counter 901, resets counter 902 to −1, and then enables counter 902. Disabling counter 901 at this stage makes sense because many flushes can occur to instruction translation lookaside buffer 310 during a single context switch, and therefore, disabling counter 901 will eliminate the generation of interrupts that are not needed by the invention.

In step 1002, kernel 210 keeps operating and can start and stop any number of processes within kernel 210.

In step 1003, a mode switch from kernel 210 to user space 220 occurs, which causes counter 902 to increment, which in turn generates a performance monitoring interrupt 911.

In step 1004, performance monitoring interrupt 911 is generated. Malware interrupt service routine 912 receives the interrupt and executes in kernel 210.

In step 1005, counter 902 is disabled and counter 901 is reset to −1 then enabled.

In step 1006, a process in user space 220 keeps operating.

In step 1007, a context switch occurs, causing a flush of instruction translation lookaside buffer 310. This increments counter 901 and triggers a performance monitoring interrupt 911.

In step 1008, malware interrupt service routine 912 executes in the kernel, immediately transitioning back to step 1001.

Figure 11:
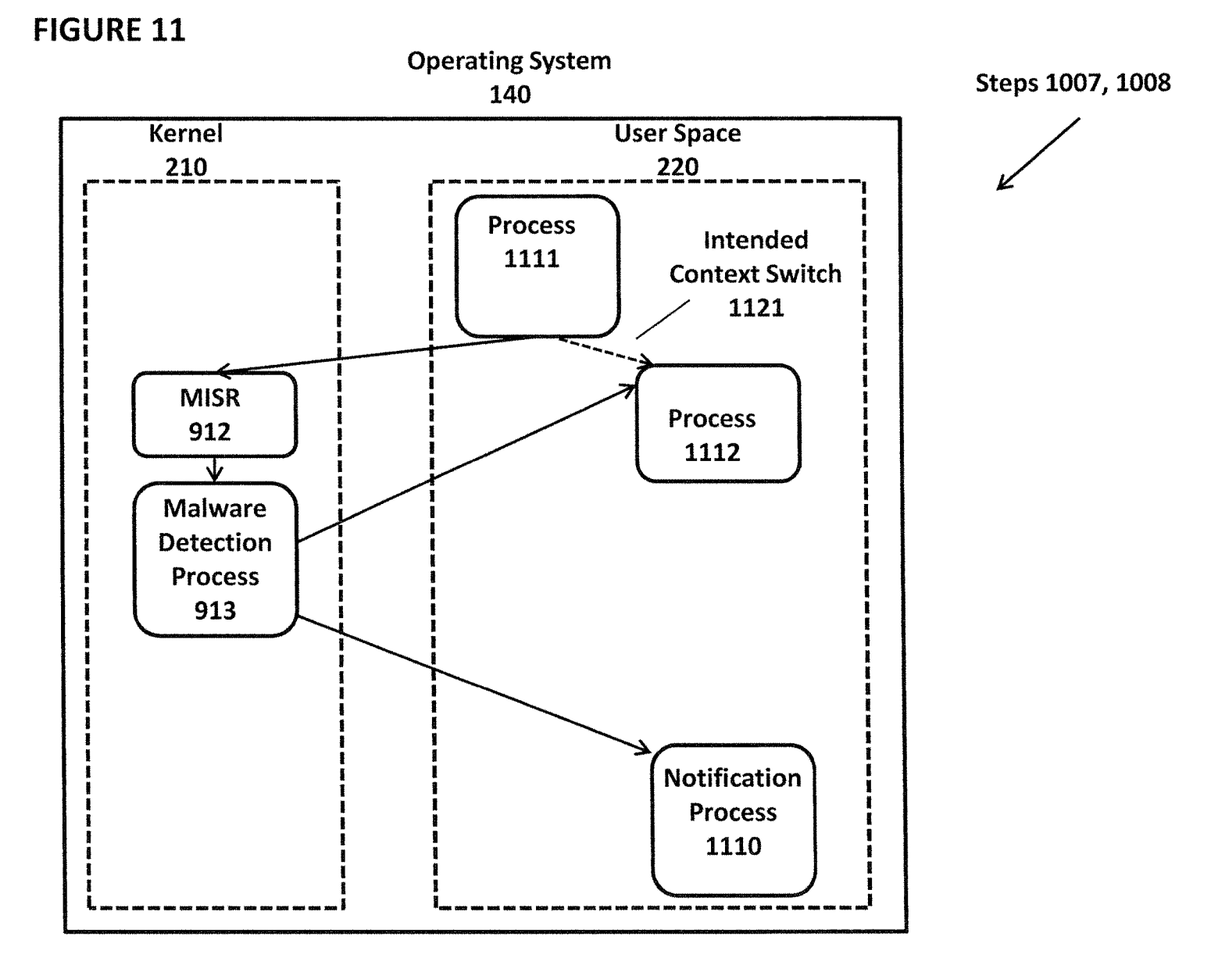
FIG. 11 depicts an embodiment of a malware detection process and notification process.

FIG. 11 depicts additional detail regarding steps 1007 and 1008. These are the critical steps in which malware would operate. Here, context switch 1121 is intended to occur to end process 1111 and begin process 1112. However, instead of beginning process 1112, performance monitoring interrupt 911 is generated and sent to malware interrupt service routine 912, which itself is a process within kernel 210. Malware interrupt service routine 912 initiates malware detection process 913 in kernel 210. Malware detection process 913 then allows process 1112 to execute. If branch prediction unit 113 mispredicts a branch while process 1112 is executing, then malware detection process 913 performs method 1200.

Figure 12:
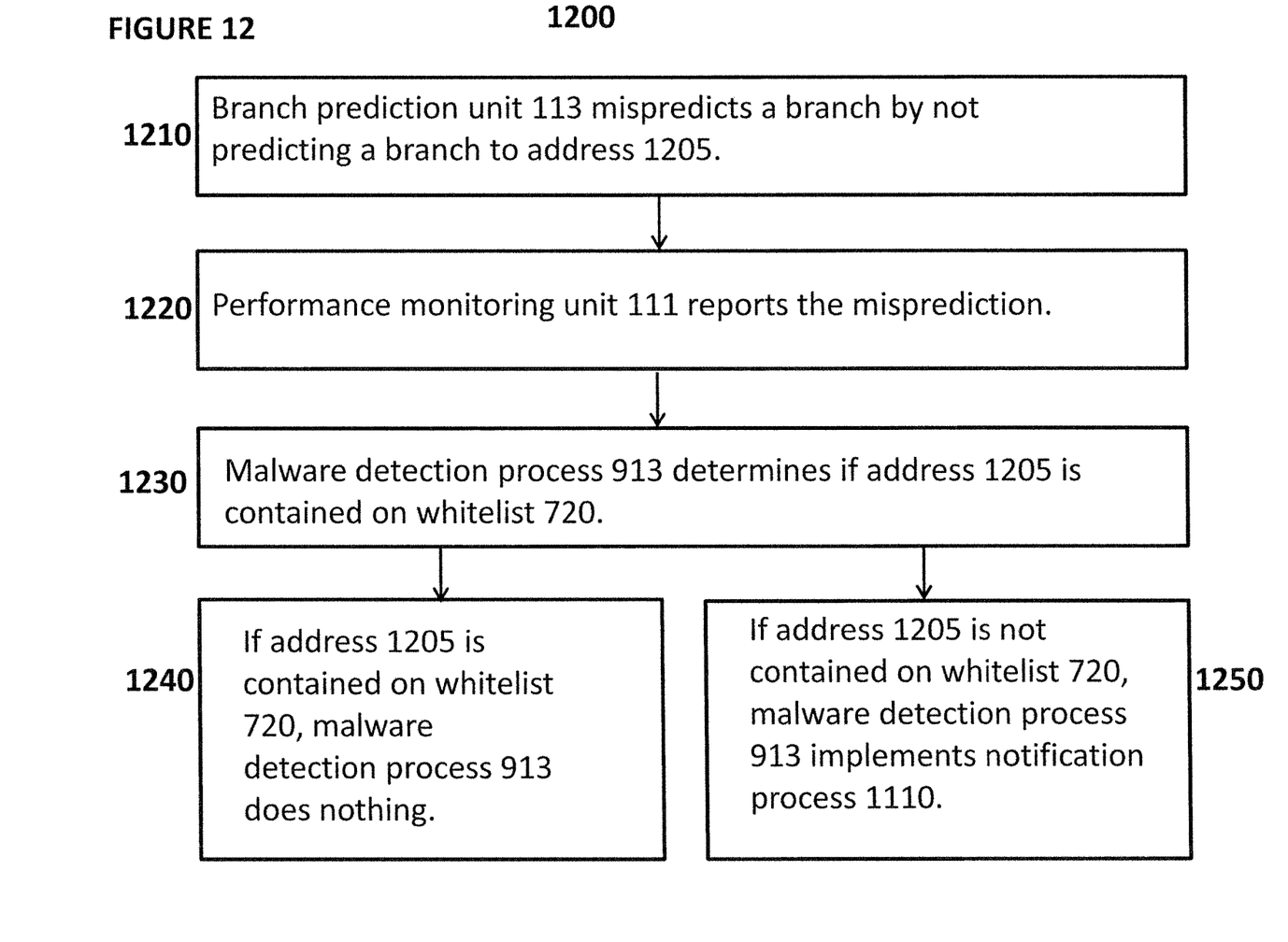
FIG. 12 depicts a malware detection process.

Method 1200 is depicted in FIG. 12. Processor 110 runs malware detection process 913, which performs method 1200. Branch Prediction Unit 113 mispredicts a branch by not predicting a branch to address 1205 (step 1210). Performance monitoring unit 111 reports the misprediction (step 1220). Malware detection process 913 determines if address 1205 is contained on whitelist 720 (step 1230). If address 1205 is contained on whitelist 720, malware detection process 913 does nothing (step 1240). If address 1205 is not contained on whitelist 720, malware detection process 913 implements notification process 1110 (step 1250).

In addition to or in place of method 1200, malware detection process 913 can implement other techniques as well. For example, it can determine if the new process to be executed (such as process 1112 in FIG. 11) is backed by disk, meaning that the code in the process is found not only in memory 120 but also in non-volatile storage 130. Malware often is not backed by disk. In contrast, legitimate processes usually are backed by disk, as they correspond to code that was loaded from non-volatile storage 130. As another example, the new process can be compared to known malware processes.

Notification process 1110 can implement numerous actions, such as: issuing an alert to a user, administrator, and/or operating system 140; freezing the application, module, process, or thread in which the suspect instruction is contained; capturing a snapshot of memory 120; and rebooting computing device 100, which will cause processor 110 and memory 120 to be flushed.

Unlike in most prior art systems, the present invention allows an interrupt to be generated as soon as a context switch occurs within a process of interest. The interrupt causes malware interrupt service routine 912 to be executed, which in turn causes malware detection process 913 to be executed. Thus, the invention provides a powerful anti-malware function that is completely lacking in the prior art.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The invention claimed is:

1. A method of identifying a context switch and detecting malware, comprising:
generating a list of permissible branch addresses;
detecting a context switch from a first process to a second process, the detecting of the context switch comprising:
detecting flushing of an instruction translation lookaside buffer, the flushing by an operating system being indicative of execution by the operating system of the context switch from the first process to the second process;
in response to the detecting of the context switch based on the detecting of the flushing, configuring a performance monitoring unit within a processor to generate a performance monitoring interrupt (PMI);
in response to the performance monitoring interrupt, enabling a malware detection module;
while the second process is executing, receiving a report from the processor that a branch prediction unit in the processor identified a branch misprediction wherein an address was not predicted by the branch prediction unit;
determining that the address, that was not predicted by the branch prediction unit, is not contained within the list of permissible branch addresses; and
in response to the determining that the address is not contained within the list of permissible branch addresses, generating, by the malware detection module, an alert or taking a protective action.

2. The method of claim 1, wherein the protective action comprises thread suspension.

3. The method of claim 1, wherein the protective action comprises thread termination.

4. The method of claim 1, wherein the protective action comprises process suspension.

5. The method of claim 1, wherein the protective action comprises process termination.

6. A method of identifying a context switch and detecting malware, comprising:
generating a list of permissible branch addresses;
detecting a context switch intended to switch execution from a first process to a second process, the detecting of the context switch being by detecting flushing of an instruction translation lookaside buffer;
incrementing, in response to the flushing, a counter;
configuring a performance monitoring unit within a processor to generate a performance monitoring interrupt (PMI) in response to the counter achieving a predetermined value;
enabling, in response to the performance monitoring interrupt, a malware detection module;
while the second process is executing, receiving a report from the processor that a branch prediction unit in the processor identified a branch misprediction wherein an address was not predicted by the branch prediction unit; and
generating, by the malware detection module, an alert or taking a protective action if the address is not contained within the list of permissible branch addresses.

7. The method of claim 6, wherein the protective action comprises thread suspension.

8. The method of claim 6, wherein the protective action comprises thread termination.

9. The method of claim 6, wherein the protective action comprises process suspension.

10. The method of claim 6, wherein the protective action comprises process termination.

11. A system for malware detection, the system comprising:
a processor configured to execute instructions stored in memory to perform a method, the method comprising:
generating a list of permissible branch addresses;
detecting a context switch from a first process to a second process by detecting flushing of an instruction translation lookaside buffer;
in response to the detecting of the context switch, configuring a performance monitoring unit within the processor to generate a performance monitoring interrupt (PMI);

in response to the performance monitoring interrupt, enabling a malware detection module;

while the second process is executing, receiving a report from the processor that a branch prediction unit in the processor identified a branch misprediction indicating an address was not predicted by the branch prediction unit;

determining that the address, that was not predicted by the branch prediction unit, is not contained within the list of permissible branch addresses; and in response to the determining that the address is not contained within the list of permissible branch addresses, generating, by the malware detection module, an alert or taking a protective action.

12. The system of claim 11, wherein the protective action comprises thread suspension.

13. The system of claim 11, wherein the protective action comprises thread termination.

14. The system of claim 11, wherein the protective action comprises process suspension.

15. The system of claim 11, wherein the protective action comprises process termination.

16. A method of operating a malware detection system in a computing device, the computing device comprising a processor comprising one or more processing cores, a performance monitoring unit, a translation lookaside buffer, and a branch prediction unit, the performance monitoring unit comprising a first counter and a second counter, the method comprising:

configuring the first counter to increment when the translation lookaside buffer is flushed;

enabling the first counter;

configuring the second counter to increment when the one or more processing cores cause a mode switch to occur;

receiving a first performance monitoring interrupt generated by the performance monitoring unit when the first counter reaches a predetermined value;

in response to the first performance monitoring interrupt, disabling the first counter, resetting and enabling the second counter, and executing a first operator-configured function;

receiving a second performance monitoring interrupt generated by the performance monitoring unit when the second counter reaches a predetermined value; and in response to the second performance monitoring interrupt, disabling the second counter and resetting and enabling the first counter.

17. The method of claim 16, wherein, upon receipt of the second performance monitoring interrupt, executing a second operator-configured function.

18. The method of claim 17, wherein the second counter increments when a branch misprediction occurs.

19. The method of claim 17, wherein the first operator-configured function enables a malware detection module.

20. The method of claim 19, wherein the second operator-configured function comprises generating an alert or taking a protective action when the branch prediction unit identifies an address that was not predicted and the address is not contained on a list of permissible branch addresses.

21. A system for malware detection, the system comprising:

a processor comprising one or more processing cores, a performance monitoring unit, a translation lookaside buffer, and a branch prediction unit, the performance monitoring unit comprising a first counter and a second counter;

a first module, executed by the processor, for configuring the first counter to increment when the translation lookaside buffer is flushed, the first module further for configuring a second counter to increment when a branch misprediction occurs;

the first module for configuring the performance monitoring unit to generate a first performance monitoring interrupt when the first counter is enabled and reaches a predetermined value, and to generate a second performance monitoring interrupt when the second counter is enabled and reaches a predetermined value; and wherein the processor is configured to, upon receipt of the first performance monitoring interrupt, disable the first counter, reset and enable the second counter, and execute a first operator-configured function.

22. The system of claim 21, wherein the processor is further configured to, upon receipt of the second performance monitoring interrupt, execute a second operator-configured function.

23. The system of claim 22, wherein the first operator-configured function enables a malware detection module.

24. The system of claim 23, wherein the second operator-configured function comprises generating an alert or taking a protective action when the branch prediction unit identifies an address that was not predicted and the address is not contained on a list of permissible branch addresses.

25. The system of claim 21, wherein the processor is further configured to, upon receipt of the second performance monitoring interrupt, disable the second counter and reset and enable the first counter.

\* \* \* \* \*

UNITED STATES PATENT AND TRADEMARK OFFICE
CERTIFICATE OF CORRECTION

| | | |
|---|---|---|
| PATENT NO. | : 10,706,180 B2 | Page 1 of 1 |
| APPLICATION NO. | : 15/644039 | |
| DATED | : July 7, 2020 | |
| INVENTOR(S) | : Gabriel Landau | |

It is certified that error appears in the above-identified patent and that said Letters Patent is hereby corrected as shown below:

On the Title Page

Item (71), - Engame. Inc., Arlington, VA (US) -, should read -- Endgame, Inc., Arlington, VA (US) --

Signed and Sealed this
Twenty-ninth Day of September, 2020

Andrei Iancu
*Director of the United States Patent and Trademark Office*